J. S. CLARK.
SAFETY GUARD FOR MOTOR VEHICLES.
APPLICATION FILED MAY 24, 1915.

1,189,346.

Patented July 4, 1916.
2 SHEETS—SHEET 1.

Inventor:—
John Samuel Clark,
by George Henry Rayner
Attorney.

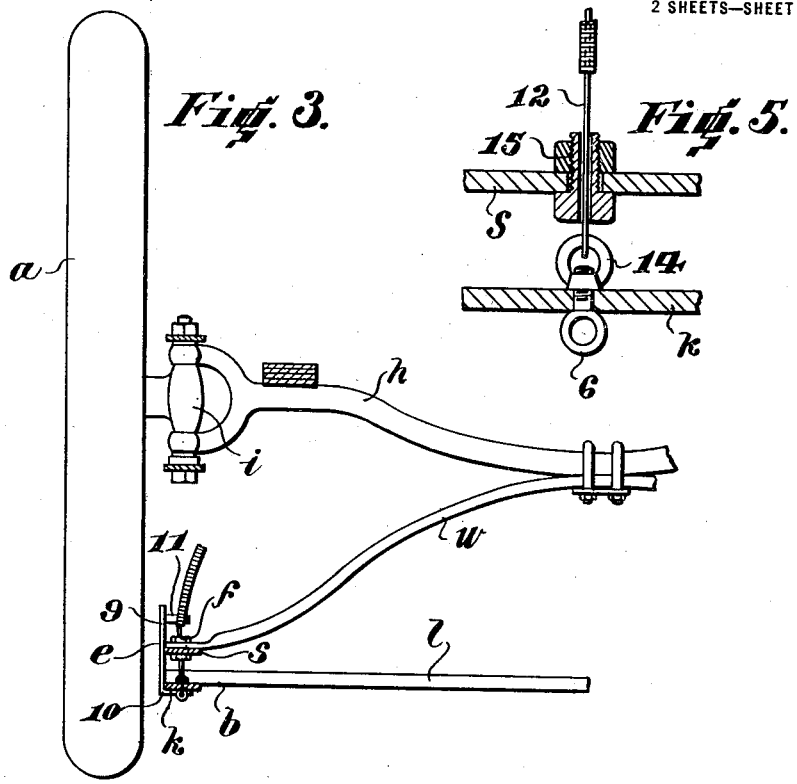
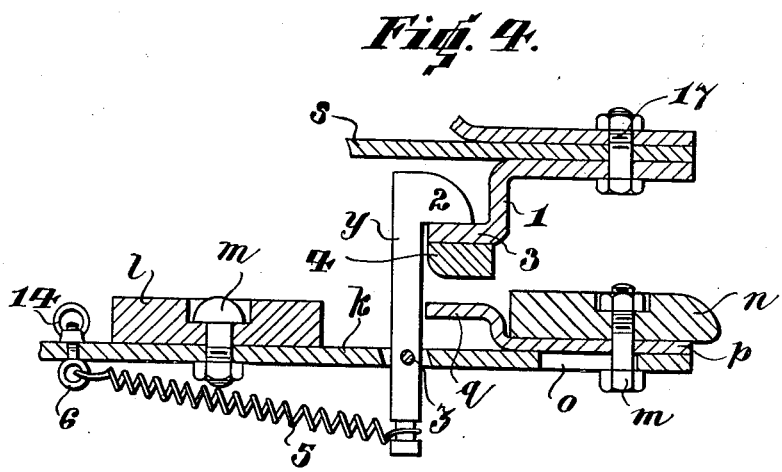

UNITED STATES PATENT OFFICE.

JOHN SAMUEL CLARK, OF CANNING TOWN, ENGLAND.

SAFETY-GUARD FOR MOTOR-VEHICLES.

1,189,346.  Specification of Letters Patent.  Patented July 4, 1916.

Application filed May 24, 1915. Serial No. 30,234.

*To all whom it may concern:*

Be it known that I, JOHN SAMUEL CLARK, subject of the King of Great Britain and Ireland, residing at 76 Clifton road, Canning Town, in the county of Essex, England, boiler-maker, have invented certain new and useful Improvements in Safety-Guards for Motor-Vehicles, of which the following is a specification.

My invention relates to splash and safety guards for motor and like vehicles.

I employ a catcher which consists of a supporting structure, and of associated front and rear means for suspending it from the vehicle, of such a character that the front means are displaced from the normal position when the catcher forcibly or appreciably strikes a person or other bulky object falling or lying in front of the vehicle, whereupon the catcher drops and becomes operative or falls into place to effect its intended use automatically. The front means include a spring-catch arrangement, and the rear means a flexible-joint and guide-and-stop device arrangement. Means are furnished for restoring the catcher to its original position ready for another operation. Incidentally, these suspending means admit of an improved or simplified assemblage of the front-wheel shields or splash-guards with the catcher, whence results a very compact and self-contained front safety-guard and splash guard combination.

Figure 2:
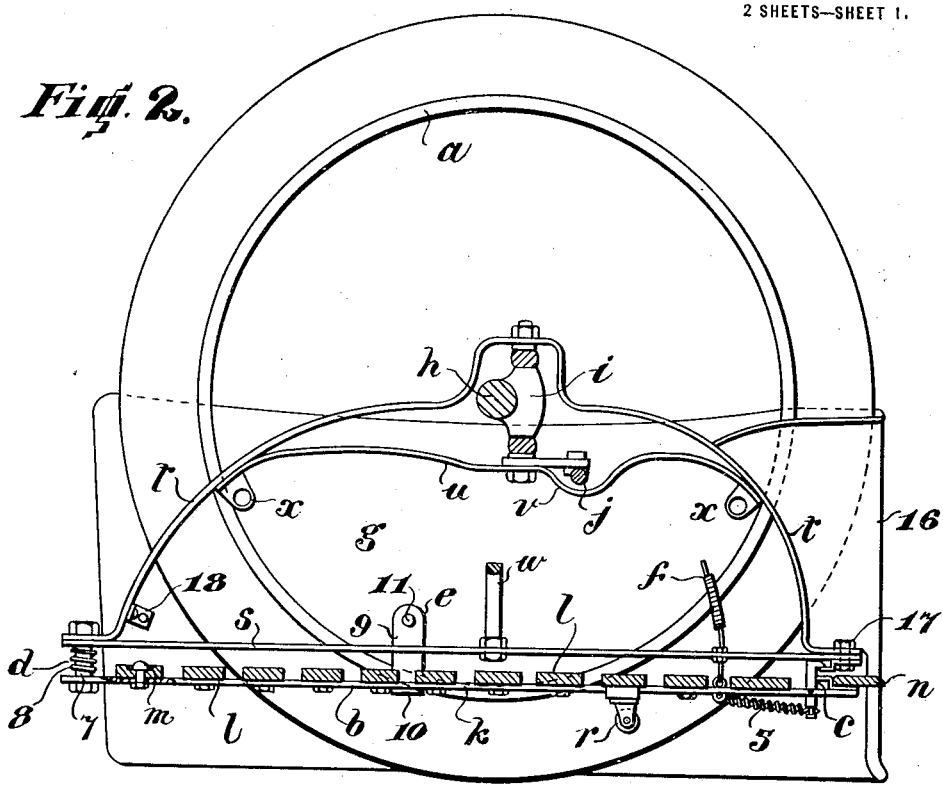
Figure 1:
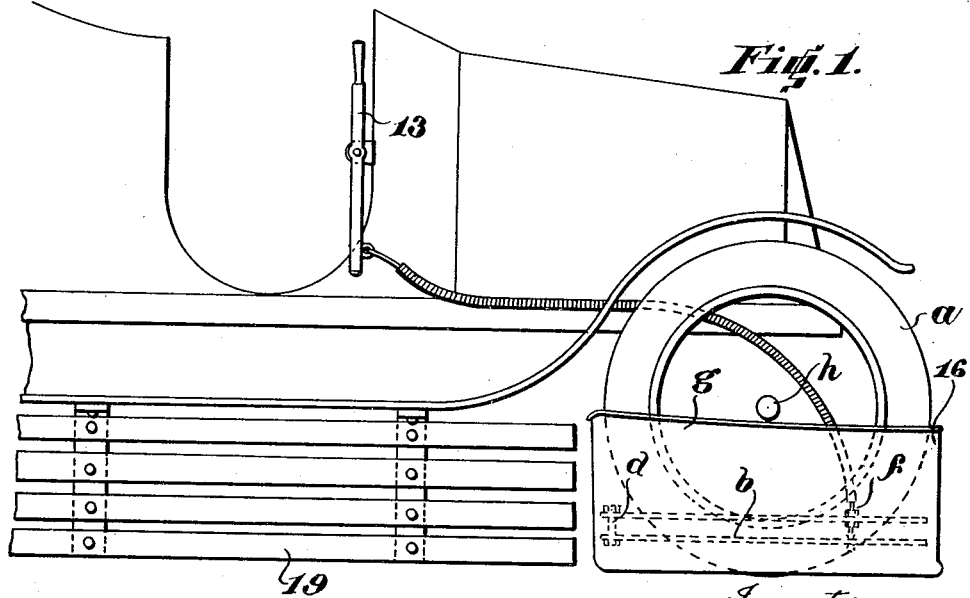

Figure 1 is a side elevation showing the general arrangement and application of the guards to a motor road vehicle in the normal or ready-for-use position. Fig. 2 is a sectional side elevation corresponding to, but drawn to a larger scale than, Fig. 1 looking from the inside of the wheel, and illustrating the complete safety-guard arrangement or combination; and Fig. 3 is a part sectional end elevation thereof. Figs. 4 and 5 are part sectional side elevations representing on an enlarged scale details included in the preceding figures.

Referring to the drawings, $a$ denotes one of the front wheels of the vehicle, $b$ the structure comprising the catcher, $c$ the spring-catch arrangement of the front suspending means, $d$ and $e$ the flexible-joint and guide-and-stop-device arrangement of the suspending means, $f$ the means for returning the catcher $b$ to the operative position, and $g$ the shield or splash-guard applied to the outside of the wheel $a$.

The wheel $a$ is customarily connected with the axle $h$ through the agency of the pivoted joint $i$, $j$ in Fig. 2, indicating the steering rod.

The structure $b$ comprises, as will be clearly understood fom Fig. 3, a pair of lateral members $k$, $k$ in the form of metal laths situated apart and joined by a series of spaced transverse wooden or like bars or members $l$, $l$ pivotally connected to them by bolts $m$, $m$ whose heads as represented in Fig. 4 repose in recesses made in the bars $l$, $l$ in order to obtain a flush upper surface or one free from obstructions. The length and width of the structure $b$ approximate respectively the diameter of the wheels $a$, $a$ and the distance between them, as illustrated in Figs. 1, 2 and 3. The foremost bar $n$, as illustrated in Fig. 4, is slidably secured to the members $k$, $k$, by its bolts, $m$, $m$ passing through slots $o$, $o$ therein. The bar $n$ does not bear directly upon the members $k$, $k$ as the other bars $l$, $l$ do, but indirectly a metal strip $p$ being interposed at each member $k$. The rear extremity $q$ of the strip $p$ is upturned to constitute a finger for co-acting with the spring-catch arrangement $c$. In short, then, the foremost bar $n$ is constructed as a push-piece. Toward its forward end, the structure $b$ is provided with swivel-wheels or casters $r$, $r$ so that it may ride easily over the road when in the operative or dropped position.

Above the members $k$, $k$ coincident with them, and constituted like them, are members $s$, $s$ which are common to the suspending means comprising the arrangements $c$, $d$ and $e$. To the front and rear end of each member $s$ is attached an arched metal member or strip $t$ whose central part embraces, and is connected to the corresponding pivoted joint $i$ of the front-wheel axle $h$. This strip $t$ is bridged by, and fastened to, a metal member or strip $u$ likewise connected to the pivoted joint $i$, this strip being depressed, as shown at $v$ in Fig. 2, to give clearance for the steering rod $j$. Further, the members $s$, $s$ are about midway of their length secured to a transverse rod $w$ depending from, and fixed to, the front-wheel axle $h$. The members $t$ and $u$ being mounted upon the steering pivots $i$ of the wheels and moving therewith, communicate this movement to the strips $s$ which turn about their points of attachment to the member $w$ fixed upon the axle. The method of pivotally securing the ends of the bars $l$ to their side strips $k$ by means of the bolts $m$ allows the catcher to be readily distorted to accommodate itself to the movement of the steering wheels $a$ which is in turn communicated to the strips $s$ by the frame members $t$.

Lugs $x$, $x$ are indicated in Fig. 2 provided upon the bridge-strip $u$, such being for the attachment of a cover or plate (not shown) serving as a splash-guard to the inside of the wheel $a$ with respect to the supporting structure $b$.

The arrangement $c$ comprises a lever $y$ pivoted at $z$ on each member $k$ of the structure $b$ in proximity to the finger $q$ of the foremost bar or push-piece $n$ thereof and an abutment or metal strip 1 secured to the corresponding superposed member $s$. The upper end of the lever $y$ is fashioned as a hook 2, and to form the complement thereto the adjoining end 3 of the abutment or strip 1 is cranked. To stiffen this end 3, which, for constructive reasons, is made thin, I apply a metal strip 4 thereto. The lower end of the lever $y$ has attached to it one extremity of a spring 5 whose other end is secured to an eye 6 secured to the member $k$; the purpose of the spring 5 is to maintain the engagement or union of the hook 2 and its complementary part 3, and to effect their engagement or union automatically as they are brought together after a disengagement.

The flexible joint $d$ is of a known kind consisting of a bolt 7 passing freely through the members $k$ and $s$, and of a spring 8 encircling the bolt 7 and abutting at its opposite end upon these members $k$ and $s$.

The guide-and-stop device $e$ consists of a metal strip or member having a vertical limb 9 embracing the sides of the members $k$ and $s$ thereby serving as a guide to the structure $b$, a foot 10 which is fastened to the underside of the member $k$, and an arm 11 for coöperating with the top of the member $s$ to serve as a stop to determine or limit the drop of the structure $b$. Appropriately, the means $f$ consist of a flexible member, such as a length of Bowden wire 12, connected at one end to a hand-lever 13 situated in proximity to the driver's seat, and divided at the other end for connection to each member $k$ of the structure $b$ through the medium of an eye 14. The wire 12 is, in consequence, led through the contiguous member $s$, and hollow bolt and nut 15.

The operation of the catcher is as follows:—As previously remarked, the drawings illustrate the parts in the position they occupy normally, or ready for use. Now, assuming a person is caught and knocked down at the front of the vehicle, then the foremost bar or push-piece $n$ of the structure $b$ contacts with the person, whereupon its fingers $q$, $q$ press upon and turn backward the levers $y$, $y$ of the catch arrangements $c$, $c$, whose hooks 2, 2 are consequently released from the abutments 3, 3 and thus permit the structure $b$ to drop or fall under gravity into a position declining from the rear, this action being permitted by the flexible joints $d$, $d$ and being determined by the contact of the arms 11, 11 of the devices $e$, $e$ with the lateral members $s$, $s$ of the suspending means. The recumbent person is thus picked up by the structure $b$ and saved from further injury, the structure $b$, running easily on the wheels or casters $r$, $r$. On the removal of the person, the means $f$ are actuated to lift the structure $b$ whose hooks 2, 2 eventually engage with the abutments 3, 3 under the influence of the springs 5, 5 or snap-fashion, and restore the required union or suspension.

At the outset I indicated that the suspending means of the catcher admitted of an effective assemblage of the wheel shields or splash-guards $g$, $g$, and this will be clear from an inspection of Fig. 2, wherein it is shown that the bent or curved forward end 16 of the shield or guard $g$ is connected to the member $s$ by the same bolt 17 that attaches the abutment or strip 1 of the spring-catch arrangement $c$ thereto; and that the rear end is secured by the bolt 7 of the flexible-joint $d$ through the medium of an arm 18 projecting inwardly from the shield or guard $g$ clear of the wheel $a$.

In Fig. 1 I have indicated the ordinary side-between-wheel guard 19, so that obviously a vehicle equipped with this guard in conjunction with my guard arrangement, is as safe as regards foot passengers as it is reasonably possible to make it.

What I claim as my invention and desire to secure by Letters Patent is:—

1. In a guard for motor vehicles, a catcher, lateral and transverse members connected to the axle, flexible connections between these members and the catcher to allow the latter to follow the movements of the steering wheels, permanent connections between the rear portion of the supporting structure and the catcher and catches upon the front of the catcher adapted to engage with the front of the said structure to support it until the front of the catcher strikes a person or obstruction in the roadway when the catches will be released and allow the front of the catcher to fall into the operative position, rollers or running wheels adapted to support the front of the catcher upon the road surface when in the operative position and means for raising the catcher and reëngaging the catches operated from the driver's seat.

2. In a safety guard for motor vehicles, a catcher comprising longitudinal side members to which are pivoted a series of transverse laths, side supporting frames mounted one on each of the steering heads and adapted to move therewith, depending front and rear ends to the frames and a connecting strip between the front and rear ends thereof, a transverse supporting bar rigidly mounted upon the axle of the vehicle and pivotal connection between each of the depending ends of this transverse supporting bar and one of the strips connecting the front and rear ends of the side frames at a point about midway between its ends, a connection between the rear ends of the side members of the catcher and the rear ends of the side supporting frames, spring catches on the forward end of the catcher adapted to engage with the forward end of the side supporting frames and rollers on the underside of the catcher to support same upon the road surface when the catches are released and it falls into the operative position.

3. In a safety guard for motor vehicles, a catcher comprising longitudinal side members to which are pivoted a series of transverse laths, side supporting frames mounted one on each of the steering heads and adapted to move therewith, depending front and rear ends to the frames and a connecting strip between the front and rear ends thereof, a transverse supporting bar rigidly mounted upon the axle of the vehicle and pivotal connection between each of the depending ends of this transverse supporting bar and one of the strips connecting the front and rear ends of the side frames at a point about midway between its ends, a connection between the rear ends of the side members of the catcher and the ends of the side supporting frames, spring catches on the forward end of the catcher adapted to engage with the forward end of the side supporting frames, a sliding bar on the front of the catcher adapted to be pressed backward when it strikes a person or obstruction, push-pieces upon this sliding bar adapted to press back the spring operated catches to disengage them from the forward ends of the side supporting frames, allowing the front of the catcher to fall into the operative position and rollers on the underside of the catcher to support same upon the road surface when the catches are released and it falls into the operative position.

4. In a safety guard for motor vehicles, a catcher comprising longitudinal side members to which are pivoted a series of transverse laths, side supporting frames mounted one on each of the steering heads and adapted to move therewith, depending front and rear ends to the frames and a connecting strip between the front and rear ends thereof, a transverse supporting bar rigidly mounted upon the axle of the vehicle and pivotal connection between each of the depending ends of this transverse supporting bar and one of the strips connecting the front and rear ends of the side frames at a point about midway between its ends, a connection between the rear ends of the side members of the catcher and the rear ends of the side supporting frames, spring catches on the forward end of the catcher adapted to engage with the forward end of the side supporting frames, a sliding bar on the front of the catcher adapted to be pressed backward when it strikes a person or obstruction, push-pieces upon this sliding bar adapted to press back the spring operated catcher to disengage them from the forward ends of the side supporting frames, allowing the front of the catcher to fall into the operative position and rollers on the underside of the catcher to support same upon the road surface when the catches are released and it falls into the operative position, an operating lever mounted on the vehicle near the driver, a flexible cable connected from this lever to the front of the catcher, an outer tube or covering around this flexible cable and anchored at each end to a fixed portion of the structure so that when the lever is operated it will again raise the catcher and engage the catches.

In witness whereof I have hereunto set my hand in the presence of two witnesses.

JOHN SAMUEL CLARK.

Witnesses:
 GEORGE HENRY RAYNER,
 FRANK WILLIAM PATTISON.

Copies of this patent may be obtained for five cents each, by addressing the "Commissioner of Patents, Washington, D. C."